(12) United States Patent
Kogo et al.

(10) Patent No.: US 7,484,869 B2
(45) Date of Patent: Feb. 3, 2009

(54) LIGHTING UNIT FOR VEHICLE

(75) Inventors: Satoshi Kogo, Saitama (JP); Hayato Ohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 11/507,013

(22) Filed: Aug. 21, 2006

(65) Prior Publication Data

US 2007/0047249 A1    Mar. 1, 2007

(30) Foreign Application Priority Data

Aug. 31, 2005    (JP) .............................. 2005-251460

(51) Int. Cl.
*F21V 7/00* (2006.01)
*B60Q 1/00* (2006.01)

(52) U.S. Cl. ................... 362/538; 362/473; 362/516; 362/517

(58) Field of Classification Search ............... 362/473, 362/516, 517, 538
See application file for complete search history.

(56) References Cited

U.S. PATENT DOCUMENTS 6,607,295 B2 * 8/2003 Hayakawa ................. 362/517

| | | | |
|---|---|---|---|
| 2003/0090906 A1 * | 5/2003 | Hayakawa | 362/517 |
| 2003/0174509 A1 * | 9/2003 | Futami | 362/517 |
| 2006/0262552 A1 * | 11/2006 | Komatsu et al. | 362/539 |
| 2007/0274081 A1 * | 11/2007 | Engel | 362/346 |

FOREIGN PATENT DOCUMENTS

| AF | 2003-288805 | 10/2003 |
|---|---|---|
| JP | 2003-338210 A | 11/2003 |

* cited by examiner

*Primary Examiner*—Sandra O'Shea
*Assistant Examiner*—James W Cranson
(74) *Attorney, Agent, or Firm*—Birch, Stewart, Kolasch & Birch, LLP (57) ABSTRACT

To improve visibility by expanding a light emitting range without increasing a size of a light source, in a lighting unit for a vehicle using a projector lamp. A front light has a projector lamp arranged behind an outer lens. A light guiding body is provided from a side surface of the projector lamp to the front. A front surface of the light guiding body emits light along a bottom surface of the front light. A first reflector and a second reflector constituting an isolated extension section extending upwards are arranged opposite to each other holding a distance between them, at a side surface of the projector lamp. The periphery of the first reflector extends out slightly more than the second reflector to form a fringe light emitting section. This causes emission of light of the light guide path in a fringe shape.

18 Claims, 6 Drawing Sheets

LIGHTING UNIT FOR VEHICLE

CROSS-REFERENCE TO RELATED APPLICATIONS

This nonprovisional application claims priority under 35 U.S.C. § 119(a) on Patent Application No. 2005-251460, filed in Japan on Aug. 31, 2005, the entirety of which is incorporated herein by reference.

BACKGROUND OF THE INVENTION

1. Field of the Invention

The present invention relates to a lighting unit for a vehicle using a projector lamp. In particular, the present invention relates to a lighting unit for a vehicle using a projector lamp that increases the visibility while not increasing the size of light source.

2. Description of Background Art

A projector lamp that irradiates light from a light source after concentrating the light source using a convex lens is known. However, a projector lamp according to the background art has a small light emitting surface area and reflection surface for intensifying the light. This means that a light guiding member for improving visibility must be attached (see Japanese Patent Laid open No. 2003-338210).

Also, in the background art, some of the light of the projector lamp escapes to the rear. The light emitting surface area is increased by reflecting this escaped light forwards using a reflector arranged behind the projector lamp (see Japanese Patent Laid open No. 2003-288805).

With any of the above-described examples according to the background art, the light emitting surface area is enlarged from a projector lamp towards its periphery. However, the effect of this on improved visibility is only proportional to the light emitting surface area. In addition, by simply increasing the light emitting surface area, the light amount of peripheral edge sections gradually decreases and visibility is reduced. Therefore, there are evidently limitations in trying to improve visibility simply by enlarging the light emitting surface area.

SUMMARY OF THE INVENTION

An object of the present invention is to further increase visibility with an enlarged light emitting range using design processing to form a light emitting section that is discontinuous from a projector lamp by causing a peripheral section isolated from the projector lamp to partially emit light.

In order to solve the above described problems, a first aspect of the present invention is directed to a vehicle lighting unit provided with a case, a projector lamp housed inside the case, and an outer lens covering an opening section of the case, arranged so that the outer lens faces towards an opening section of a vehicle body cover, wherein an isolated extension section extending out so as to come away from the projector lamp is provided, the isolated extension section provided with a light guiding path formed by a first reflector positioned behind the projector lamp for reflecting light forwards, and a second reflector covering a front part of the first reflector for reflecting light to the rear, and an isolated light emitting section for emitting using light that has been guided from the projector lamp by the light guiding path being provided at a position of the isolated extension section away from the projector lamp.

According to a second aspect of the present invention, the isolated light emitting section reflects light that has been guided by the light guiding path forwards from a section of the first reflector that is not covered by the second reflector.

According to a third aspect of the present invention, the isolated light emitting section emits light in a fringe shape along at least part of a peripheral edge section of the isolated extension section.

According to a fourth aspect of the present invention, the first reflector and the second reflector differ from each other in size, and looking from the front, the second reflector overlaps the first reflector, with a periphery of the first reflector overhanging the periphery of the second reflector, and the fringe shaped light emitting region is defined by the overhanging section.

According to a fifth aspect of the present invention, the second reflector is semitransparent, allowing the guided light to partially pass through, and overall performs plane emission.

According to a sixth aspect of the present invention, the lighting unit is a front light provided in a vehicle body cover for covering the front of a motorcycle, and the isolated extension section is formed along a side surface of the vehicle cover.

According to the first aspect of the present invention, an isolated extension section is provided extending out so as to come away from the projector lamp is provided, a light guiding path formed by a first reflector positioned behind the projector lamp for reflecting light forwards, and a second reflector covering a front part of the first reflector for reflecting light to the rear, is provided in the isolated extension section, and it is possible to form an isolated light emitting section for emitting light using light that has been guided from the projector lamp by the light guiding path being provided at a position of the isolated extension section away from the projector lamp. It is therefore possible to enlarge a light emitting range as far as a position isolated from the projector lamp, and it also possible to increase visibility beyond that obtained by simply increasing the light emitting surface area, due to the fact that freedom of design of the projector lamp and the isolated light emitting region is brought about. Also, the light guiding path can be formed with a simple structure and cheaply, and it is possible to prevent an increase in a light source because light emission is performed using light of the projector lamp.

According to the second aspect of the present invention, the isolated light emitting section reflects light that has been guided by the light guiding path forwards from a section of the first reflector that is not covered by the second reflector. It is therefore possible to simply form the isolated light emission section.

According to the third aspect of the present invention, the isolated light emitting section is provided so as to fringe at least part of the isolated extension section. Therefore, it is possible to improve the design effect of the light.

According to fourth aspect of the present invention, the first reflector and the second reflector differ from each other in size, and, looking from the front, the second reflector overlaps the first reflector, with a periphery of the first reflector overhanging the periphery of the second reflector. Therefore, it is possible to simply form a fringe shaped light emitting region using the overhanging section.

According to the fifth aspect of the present invention, the second reflector is semitransparent, allowing the guided light to partially pass through, and overall performs plane emission. Therefore, it is possible to improve both designability and visibility.

According to the sixth aspect of the present invention, the lighting unit is a front light provided in a vehicle body cover for covering the front of a motorcycle, and the isolated extension section is formed along a side surface of the vehicle cover. Therefore, it becomes possible to freely form the isolated extension section sufficiently large using a side surface of the vehicle cover, and it is possible to improve both design freedom and visibility.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the accompanying drawings. The same reference numerals will be used to identify the same or similar elements throughout the several views.

Figure 1:
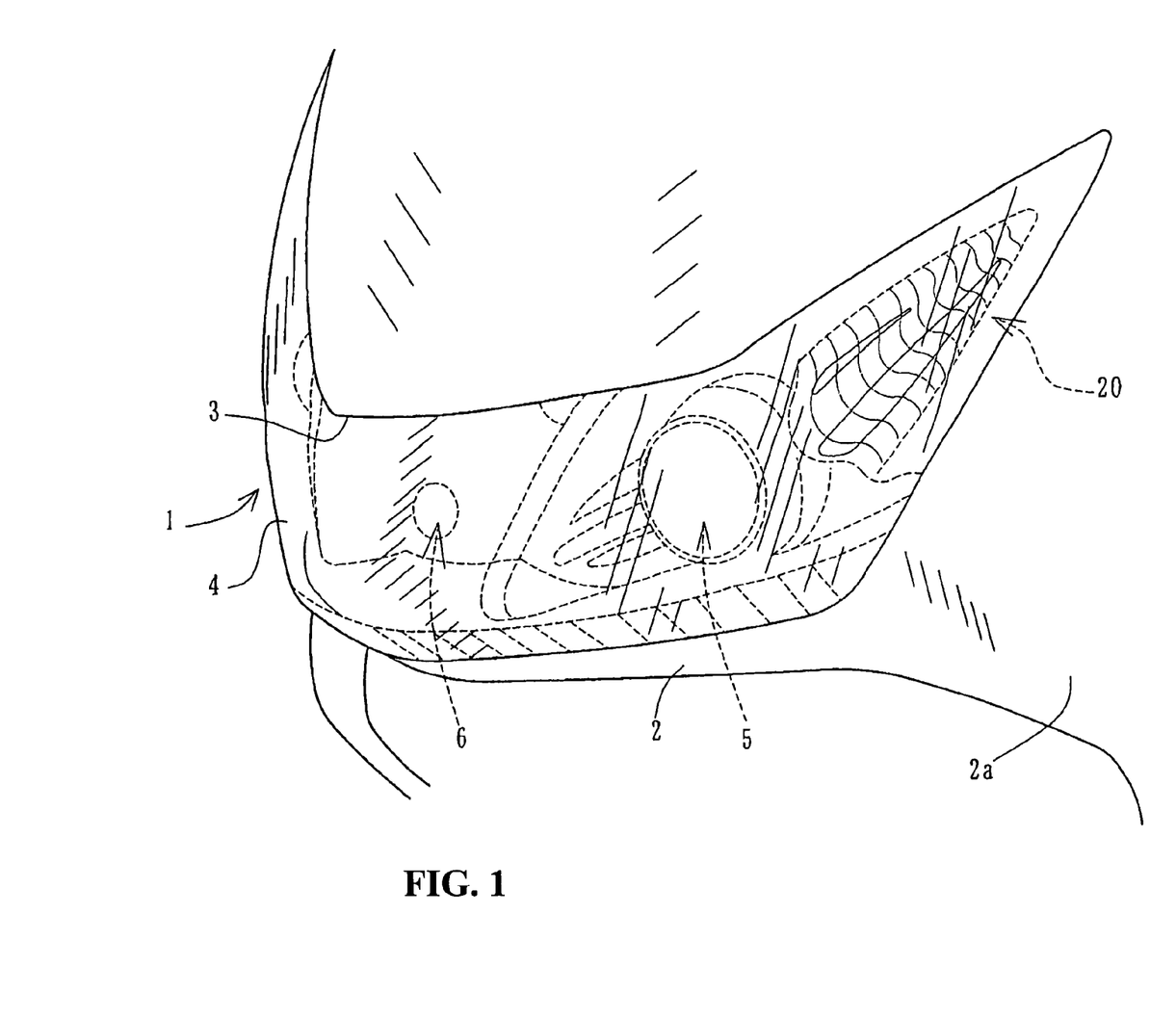
FIG. 1 is a perspective view showing a vehicle front section of a motorcycle.

FIG. 1 is a perspective drawing showing a front light 1 for a motorcycle relating to this embodiment. The front light 1 is fitted into a front light attachment hole 3 formed in the front of an upper cowl 2 covering a front end section of the vehicle, as part of a vehicle cover. The front surface is covered by an outer lens 4, which is a transparent cover lens. A projector lamp type low beam lamp 5 is provided at an inner side section of the outer lens 4, and a high beam lamp 6 is arranged in the center.

An isolated extension section 20, that will be described later, being part of the front light 1, and a section extending outwards diagonally upwards from the low beam lamp 5 are formed comparatively largely along a side surface 2a of the upper cowl 2. In particular, the isolated extension section 20 is formed in a substantially acute angled triangular shape that projects diagonally upwards and to the rear so as to run along the entire side surface. An upper end position of the isolated extension section 20 is much higher than a position of the high beam lamp section 6 of the central part, and is about twice the height. However, this height, size and shape can be arbitrarily chosen (see FIG. 1).

Figure 2:
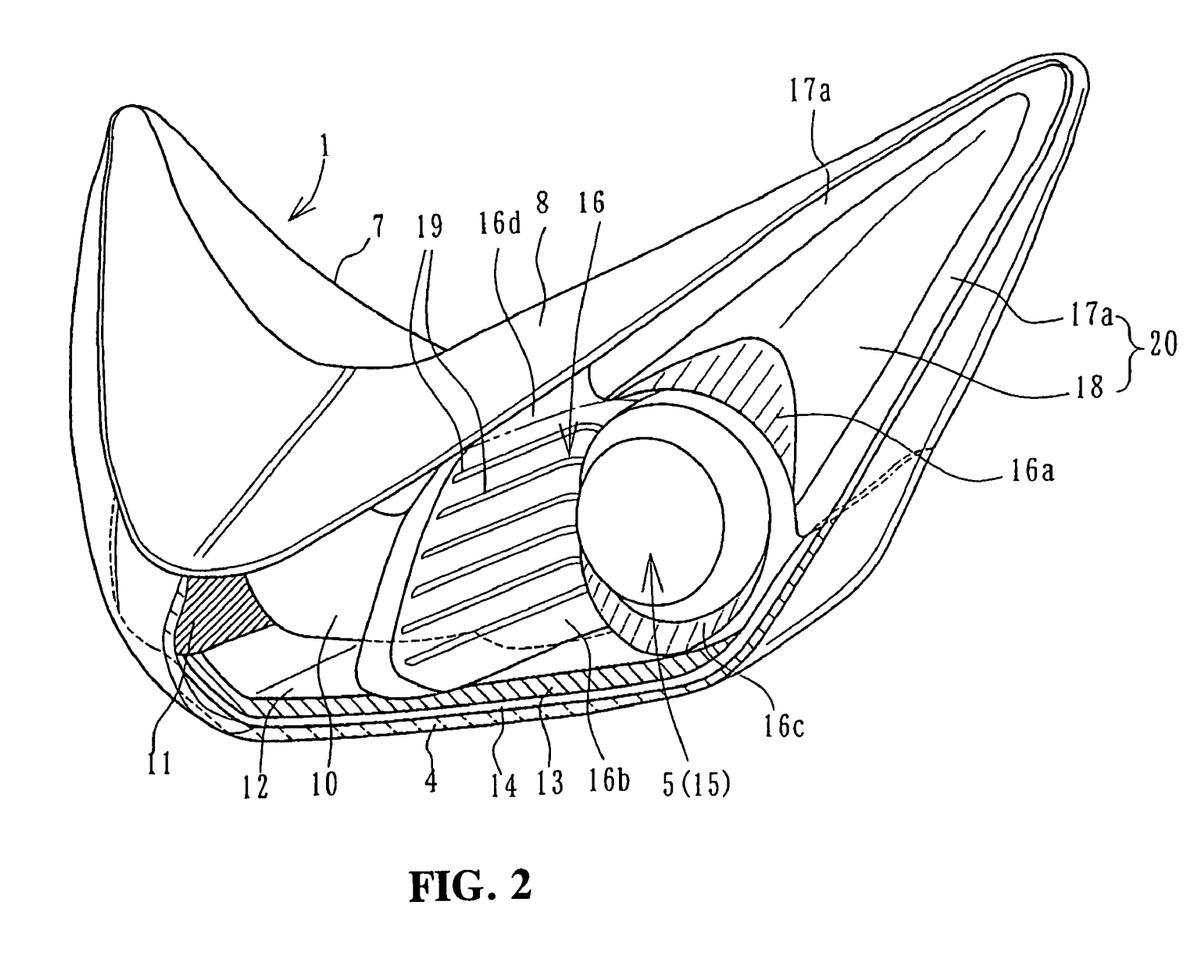
FIG. 2 is a perspective view showing a front light mounted on the motorcycle.

FIG. 2 is a perspective drawing similar to FIG. 1 showing a light body of the front light 1 on its own. The external shape of the front light 1 is configured by a case 7 and the outer lens 4 covering a front surface opening section of the case 7. The case 7 is covered by the outer lens 4 using cosmetic covers 8, 9 defining upper and lower sections of the case 7. The cosmetic covers 8 and 9 have a light leakage prevention function.

The outer lens 4 in this drawing has a vehicle body left side section missing from the center, and a side surface upright wall 11 of a high beam compartment 10 housing the high beam lamp 6 is formed so as to define a diffuse reflection surface by Lorette processing.

A light guiding body 12 is provided at a bottom section of the high beam compartment 10. The light guiding body is molded from a well known light guiding resin, and extends integrally and continuously as far as bottom sections of left and right low beam lamps 5. A crimp is formed in an output surface 13, which is a front side end surface of the light guiding body 12. A lower part of the output surface 13 is formed into a chrome plated fringe section 14.

The low beam lamp 5 is provided with a projector lamp 15. A design cover 16 surrounds the periphery of the projector lamp 15. A second reflector 18 is formed in a substantially triangular shape and extends from an upper part of the cover 16b diagonally upwards. A fringe light emitting section 17a appears to fringe the reflector 18. The second reflector 18 and the fringe light emitting section 17a constitute the isolated extension section 20 that is separated from the projector lamp 15 and extends outwards towards the periphery of the lamp.

The design cover 16 is a design section that can be seen from the outside through the outer lens 4 when the projector lamp 15 is off, and integrally and continuously provided with an upper section 16a and a lower section 16b. The upper section 16a covers an upper side periphery of the projector lamp 15 as far as the vicinity of the lower part of the second reflector 18, and has a course crimp formed on a front surface. The lower section 16b is a member for covering the projector lamp 15 as far as the side surface upright wall 11, and is comprised of an uncrimped accent line 19 (only part is shown by the symbol) and another section having a crimp.

Of the lower section 16b, a section around the projector lamp 15 also has a crimp formed roughly on a ring shaped section 16c for covering a lower side of the projector lamp in a substantially crescent shape. Above a section shown by 16d at an upper part of the lower section 16b an end surface of the side surface upright wall 11 is also not crimped. A front surface side of the second reflector 18 is subjected to appropriate design, such as plating. The pattern, etc. of these crimps constitutes a design section that can bee seen through the outer lens 4 when the light is off.

Figure 3:
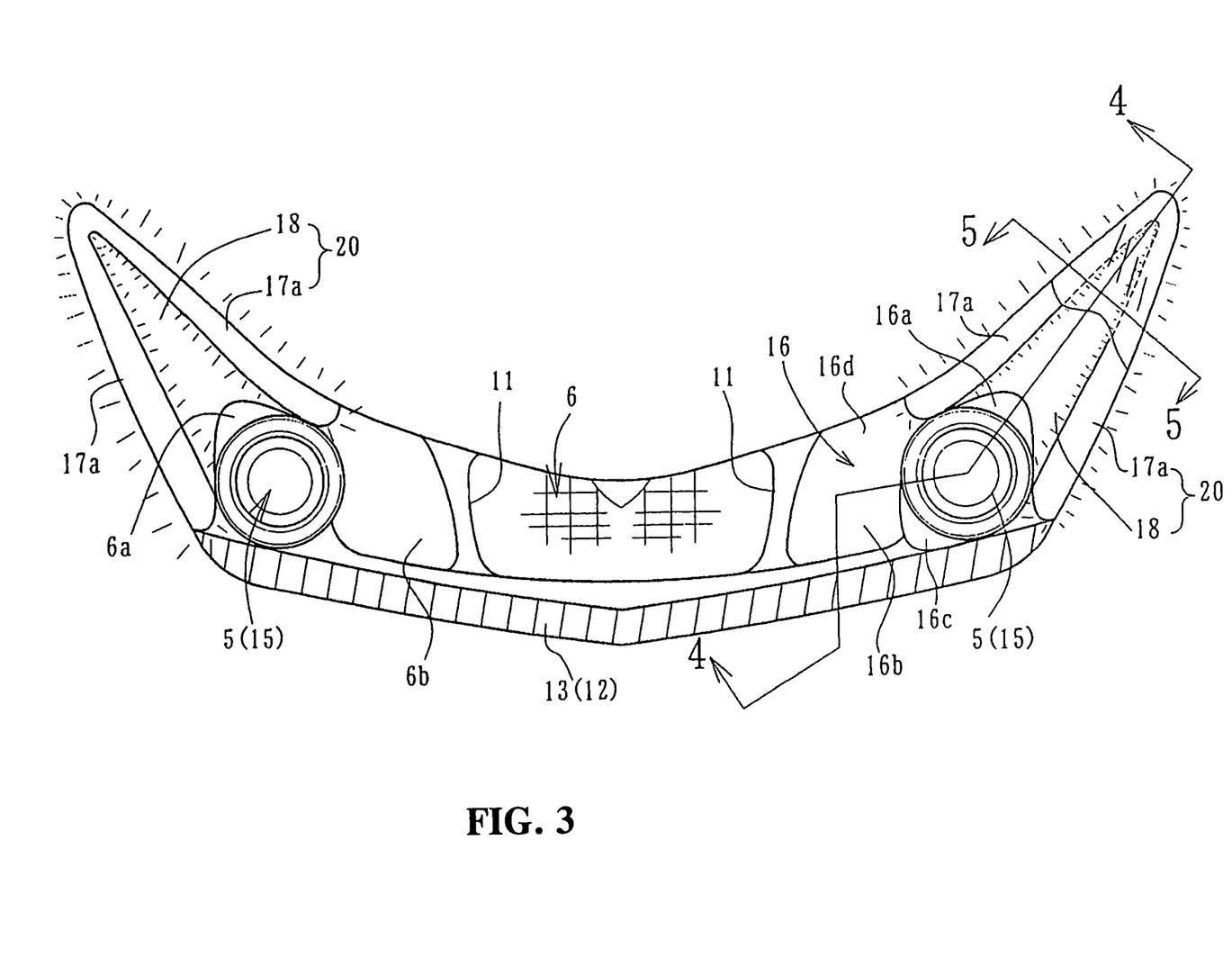
FIG. 3 is a front view of the front light.

FIG. 3 is a front perspective view of the front light 1. The front light 1 is made substantially in a V-shape, with a light source comprising a total of three lights, namely a well known multi-reflector type high beam lamp 6 and a pair of low beam lamps 5 arranged to the left and right of the high beam lamp 6, arranged transversely. Isolated extension sections 20 extending diagonally upwards in an outwardly opening shape are provided as a pair on left and right sides. A light guiding member 12 is provided below each light source to the overall left to right length of the bottom part of the front light 1.

Figure 4:
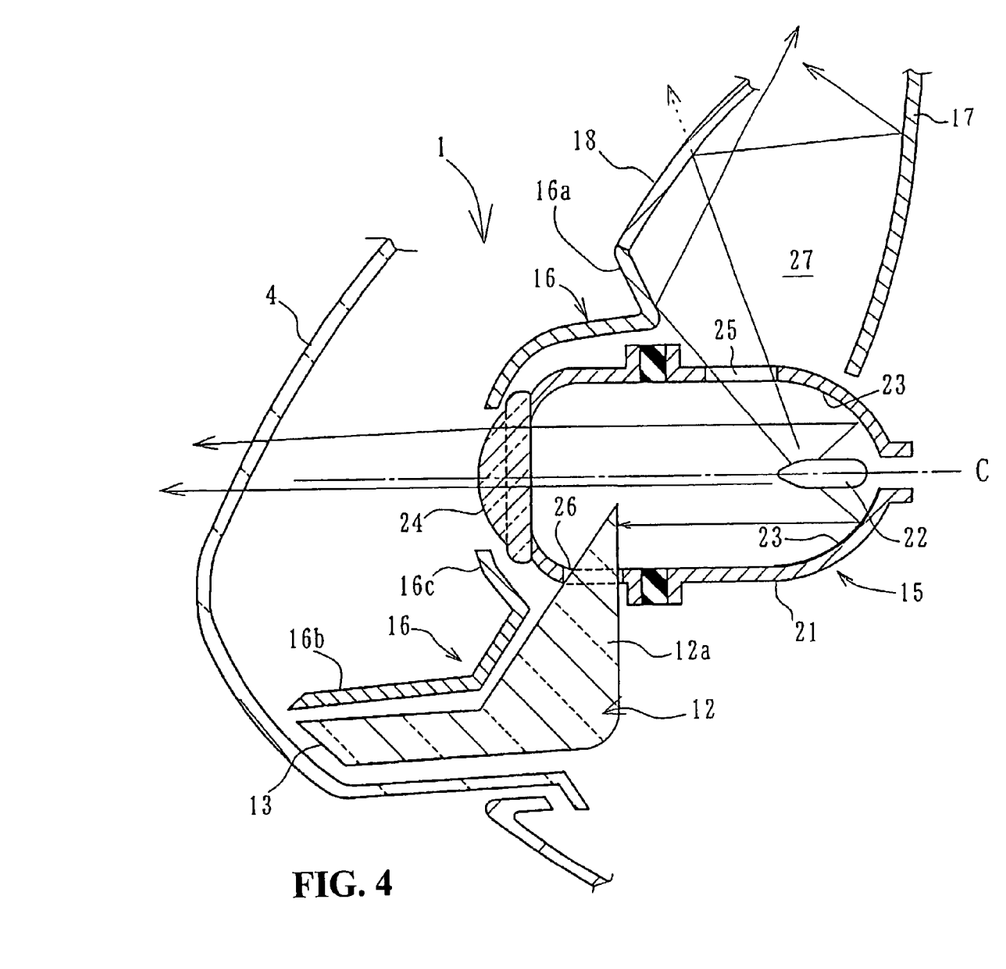
FIG. 4 is a cross sectional view along line 4-4 in FIG. 3.

FIG. 4 is a cross sectional drawing along line 4-4 in FIG. 3. The projector lamp 15 is a light source unit provided with a substantially cylindrical housing 21. A light source 22 is provided at a rear end central section inside the housing 21. A concave housing inner reflector 23 is provided behind the light source 22. A convex lens 24 is provided at a front surface side. Reflected light from the light source 22 and the reflector 23 is condensed onto the convex lens 24, and a focused light beam along the irradiation axis C is output to the front (in the direction of the arrows.

A first reflector 17, which is an external part to the projector lamp 15, extends upwards at a position behind the projector lamp 15. A second reflector 18 is arranged at an opposite position distanced from the front, to shield the front of the first reflector 17. However, as will be described later, the second reflector 18 is formed slightly smaller than the first reflector 17, with a peripheral section of the first reflector 17 being not covered and constituting a fringe light emitting section 17*a*.

The second reflector 18 is formed as a double sided reflecting plate, and extends upwards continuing on from an upper end of the upper section 16*a* of the design cover 16.

At a section where there is no exposure to illumination towards the front at a side section of the housing 21, a window hole 25 is provided at a position closest to the upper part 16*a* of the design cover 16 and to the rear. Light that escapes to the outside from this hole is reflected at the upper section 16*a* and a rear surface of the second reflector 18, and a front surface of the first reflector 17.

Light going from the upper section 16*a* and the second reflector 18 towards to the first reflector 17 is reflected again towards the second reflector 18 in front. However, since the second reflector 18 is a double-sided light emitting type, light is reflected again to the first reflector 17. As a result of this repeated reflection, light is guided to the fringe light emitting section 17*a*, being a peripheral section of the first reflector 17. Specifically, the gap between the second reflector 18 and the first reflector 17 defines a light guiding section 27 towards the fringe light emitting section 17*a*.

Reflected light within the light guiding section 27 goes in random directions, such as the longitudinal direction of the second reflector 18 and the width direction, which is substantially orthogonal to this (refer to FIG. 3). The light shown by the dotted line in FIG. 4 represents light that reaches the light emitting section 17*a* in the width direction, and passes through the light emitting section 17*a*. Incidentally, light for emission of the fringe light emitting section 17*a* is not used for illumination of the front of the projector lamp 15, and is what may be termed a surplus component. The main purpose of the second reflector 18 is to shield light from the first reflector 17, but as will be described later it is also possible to freely change the shape and material of the second reflector 18.

A light guiding body 12 formed in a substantially L-shaped cross section is provided at a front side of the projector lamp 15. An upper end section of the vertical section 12*a* projects inwards from the window hole 26 provided in the bottom section of the housing 21. Light is condensed from this point, passing through the main body of the light guiding body 12 extending substantially horizontally to the front to guide light to the output surface 13, which is a front end surface of the light guiding body 12.

The output surface 13 faces toward an inner side of the outer lens 4. Light is emitted here, and a linear light emitting section is formed along the entire left to right length at a bottom surface of the front light 1. An upper surface of the light guiding body 12 and a front surface of the vertical section 28 are covered by the lower section 16*b*. Also, a lower surface side of the outer lens 4 is covered by the cosmetic cover 9, preventing light leakage.

Figure 5:
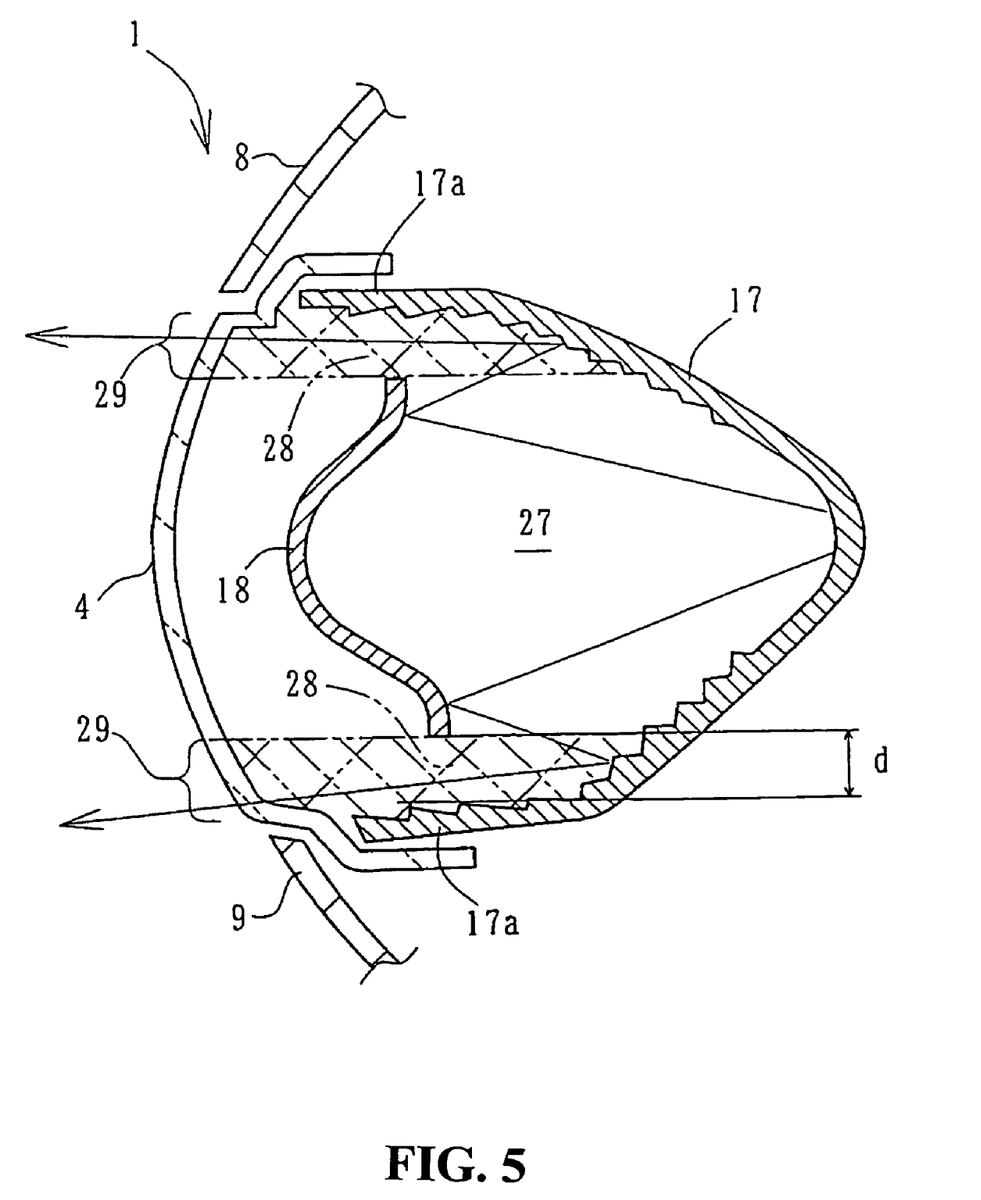
FIG. 5 is a cross sectional view along line 5-5 in FIG. 3.

FIG. 5 is a cross section along line 5-5 in FIG. 3. The second reflector 18 is formed with a curved surface bending to the front in a convex shape so as to reflect light going towards the first reflector 17. The first reflector 17 is a curved uneven surface towards the rear, with a front surface being formed so as to be multi-cut to carry out diffuse reflection. The second reflector 18 and the first reflector 17 are formed with a shape from the front that are similar, and are respectively substantially triangular projecting longitudinally in an acute shape diagonally upwards. (Refer to FIG. 1 to FIG. 3)

The second reflector 18 overlaps the front of the first reflector 17. Since it is made slightly smaller there is a gap 28 of the previously mentioned dimension d between the periphery of the second reflector 18 and the end section of the first reflector 17. Because of this gap 28, the end section of the first reflector 17 constitutes a fringe light emitting section 17*a* protruding in a fringe shape from the periphery of the second reflector 18.

Light that has reached the gap 28 through the light guiding path 27 passes through this gap 28 in the direction of the outer lens 4, and is irradiated to the front of the front light 1. Accordingly, when looking at the front light 1 from the front etc., the fringe light emitting section 17*a* causes a bright fringe glowing at the periphery of the first reflector 17 and a bright fringe glowing similarly at the periphery 29 of the outer lens 4, like the sections shown by the hatching lines in the drawing. Also, as shown in FIG. 1, a linear light emitting section that is shaped substantially like an inverted V is formed, and light is emitted so as to surround this section at a position separated from the projector lamp 15.

An operation of this embodiment will now be described. As shown in FIG. 4, if the projector lamp 15 is lit, light of that section is guided in a light guiding path 27 between the first reflector 17 and the second reflector 18 to cause light emission of a fringe light emitting section 17*a*. At the same time, light is guided by the light guiding body 12 to the front end surface of the light guiding body 12, so that the light is emitted linearly, extending completely from right to left at the bottom part of the front light 1.

In this way, as shown in FIG. 1, compared to a projector lamp 15 of a comparatively narrow light emitting area, the front light 1 emits light from the fringe light emission section 17*a* so as to frame the periphery of the isolated projection section 20 provided separately to the periphery of the projector lamp 15. Similarly, peripheral sections of the outer lens 4 along the isolated extension section 20 are also framed. At this time, the periphery of the projector lamp 15 is shaded by the design cover 16, and the isolated extension section 20 also shades a section overlapping the first reflector 17 using the second reflector 18. This means that the fringe light emission section 17*a* exists between an upper section 16*a* of the design cover 16, which is a non-light emission sections, and the second reflector 18. Since this constitutes a light emission section that is not continuous with the projector lamp 15, it is more clearly visible.

The periphery of the isolated extension section 20 is formed in a framed manner so as to enclose the projector lamp 15 at a position separated from the projector lamp 15. Therefore, light emission is carried out over a comparatively wide range, and is clearly differentiated from the projector lamp 15. In addition, since light emission is made linear, comparatively string light emission is brought about, and a novel light design is presented with a substantially inverted V-shape.

As a result, it becomes more likely to attract the attention of people nearby, improving visibility. Furthermore, using the light guiding body 12 linear light emission to the bottom section front surface of the front light 1 similarly contributes to increased visibility. As a result, even with a front light 1 using a conventional projector lamp 15 having a comparatively narrow light emission surface area, it is possible to sufficiently increase visibility, and moreover it is possible to achieve simply without increasing a size of the light source.

Furthermore, the fringe light emitting section 17*a* is made up of a first reflector 17 and a second reflector 18 of different size. This means that a projecting peripheral section 29 of the first projector 17 exists at the periphery of the second reflector 18. A gap between the first projector 17 and the second projector 18 forms a light guide path, resulting in simplified structure and low cost.

Also, the shape of the fringe light emitting section 17a can be any shape other that the substantially inverted V-shape described above. The width of the fringe light emitting section 17a can be more freely designed, such as wide or narrow, straight or curved, or of a more complex free curved shape. The degree of design freedom for light design presentation is increased.

In particular, by varying the shape and material of the second reflector 18 it is possible to cause a variation in the amount of light emission of the second reflector 18 itself, and the shape and amount of light of the fringe light emission section 17a that will be described later. Therefore, it is possible to easily change the visual quality of the outward design appearance and light representation. Specifically, the second reflector 18 is given a certain degree of optical transparency, and also that transparency is varied to make it possible for the second reflector 18 to emit light strongly.

Furthermore, by providing the front light 1 in an upper cowl 2 of a motorcycle, since the isolated extension section 20 is formed along the side surface of the vehicle cover it is possible to form sufficiently largely along a side surface 2a of the upper cowl 2. Moreover, since the size and shape can be freely designed, by bringing about a degree of design freedom for the isolated light emission sections it is also possible to significantly increase visibility beyond the simple increase in surface area, and it is possible to improve design freedom and visibility.

Figure 6:
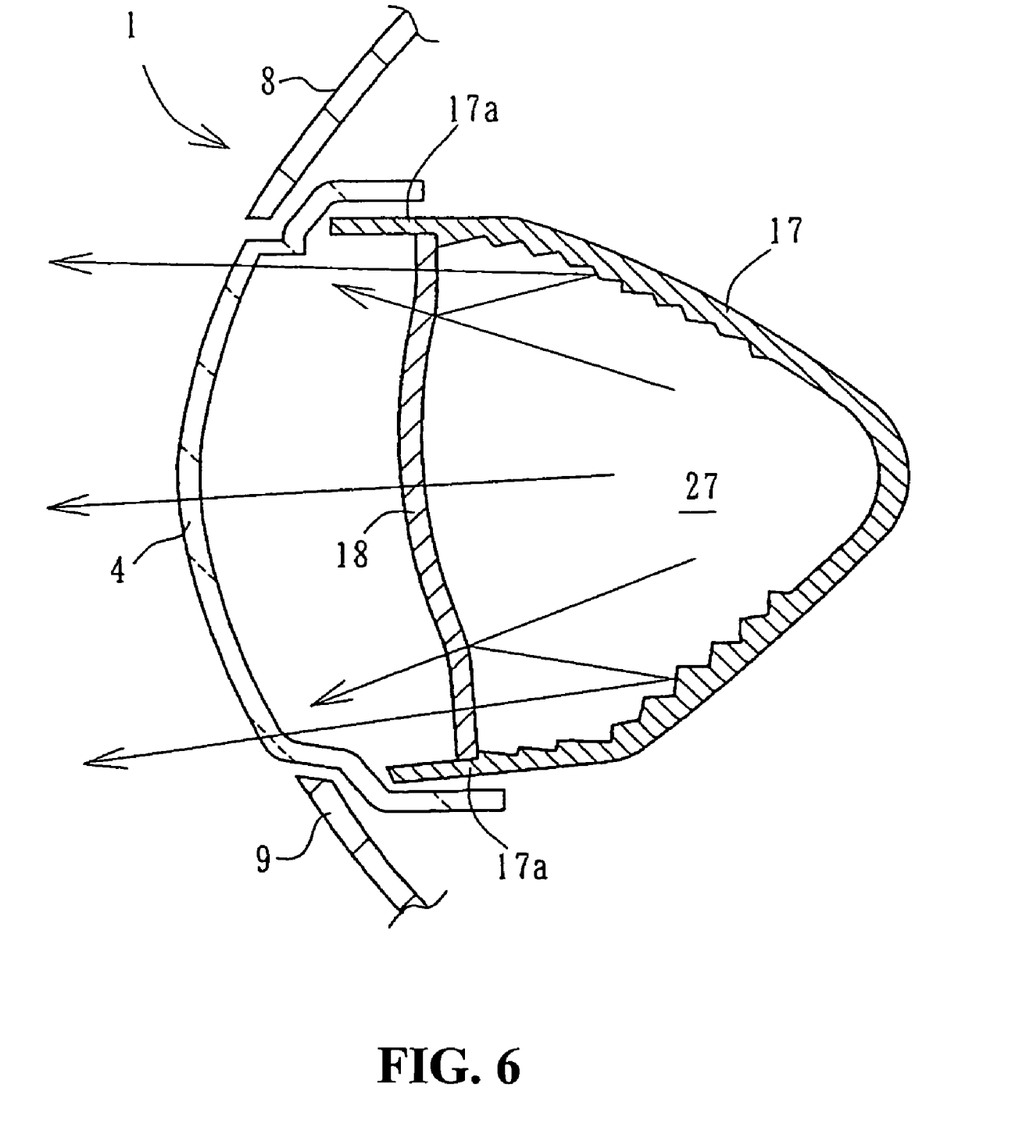
FIG. 6 is drawing of another embodiment similar to FIG. 5.

FIG. 6 is another embodiment that has further slight changes to the second reflector 18 of FIG. 5. In the following, common sections use common reference numerals. The second reflector 18 of this embodiment is made from a semitransparent mirror material for passing light to a certain degree. The periphery is adhered to the first reflector 17 without the gap of the previously described embodiment. In doing this, it is possible to make the entire second reflector 18, being the isolated extension region 20, emit light strongly at the surface. At this time, by selecting the material of the second reflector 18 it is possible to adjust the optical transparency of the reflector 18, the strength and color of emitted light are varied, and it is possible to simply change the outward design and quality of appearance.

The present invention is not limited to the above described embodiments, and various changes and applications are possible, for example, instead of providing the fringe light emission section, it is also possible to provide small holes scattered around in the isolated extension section 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting unit for a vehicle, comprising:
   a case;
   a projector lamp housed inside the case;
   an outer lens covering an opening section of the case, said outer lens being arranged to face towards an opening section of a vehicle body cover; and
   an isolated extension section extending away from the projector lamp, the isolated extension section provided with a light guiding path formed by a first reflector positioned behind the projector lamp for reflecting light forwards, a second reflector covering a front part of the first reflector for reflecting light to the rear, and an isolated light emitting section that performs light emission using light that has been guided from the projector lamp by the light guiding path, the isolated light emitting section being provided at a position of the isolated extension section away from the projector lamp.

2. The lighting unit for a vehicle according to claim 1, wherein the isolated light emitting section reflects light that has been guided by the light guiding path forwards from a section of the first reflector that is not covered by the second reflector.

3. The lighting unit for a vehicle according to claim 2, wherein the isolated light emitting section emits light in a fringe shape along at least part of a peripheral edge section of the isolated extension section.

4. The lighting unit for a vehicle according to claim 3, wherein the first reflector and the second reflector differ from each other in size, and looking from the front, the second reflector overlaps the first reflector, with a periphery of the first reflector overhanging the periphery of the second reflector, and the fringe shaped light emitting section is defined by the overhanging section.

5. The lighting unit for a vehicle according to claim 1, wherein the second reflector is semitransparent, allowing the guided light to partially pass through.

6. The lighting unit for a vehicle according to claim 1, wherein the lighting unit is a front light provided in a vehicle body cover for covering the front of a motorcycle, and the isolated extension section is formed along a side surface of the vehicle cover.

7. The lighting unit for a vehicle according to claim 5, wherein the lighting unit is a front light provided in a vehicle body cover for covering the front of a motorcycle, and the isolated extension section is formed along a side surface of the vehicle cover.

8. The lighting unit for a vehicle according to claim 1, further comprising a light guiding body provided below the projector lamp, said light guiding body being molded from a light guiding resin and guiding a portion of the light emitted from the projector lamp to a location below the projector lamp.

9. The lighting unit for a vehicle according to claim 1, wherein the second reflector is formed with a curved surface bending to the front in a convex shape so as to reflect light towards the first reflector, the first reflector has a curved uneven surface towards the rear, with a multi-cut front surface to carry out diffuse reflection.

10. A lighting unit for a motorcycle, comprising:
    a case having an open front and a closed rear;
    a high beam lamp and a pair of low beam lamps housed inside the case, said low beam lamps being located on left and right sides of the high beam lamp;
    an outer lens covering the open front of the case,
    a light extension section extending away from each of the low beam lamps, each of the light extension sections including a first reflector positioned behind a respective of the low beam lamps for reflecting light forwards, a second reflector covering a front part of the first reflector for reflecting light to the rear, and a light emitting section located away from the respective low beam lamp that performs light emission using light that has been reflected off of the first reflector.

11. The lighting unit for a vehicle according to claim 10, wherein the light emitting section reflects light that has been reflected forwards from a section of the first reflector that is not covered by the second reflector.

12. The lighting unit for a vehicle according to claim 11, wherein the light emitting section emits light in a fringe shape along at least part of a peripheral edge section of the light extension section.

13. The lighting unit for a vehicle according to claim 12, wherein the first reflector and the second reflector differ from each other in size, and looking from the front, the second reflector overlaps the first reflector, with a periphery of the first reflector overhanging the periphery of the second reflector, and the fringe shaped light emitting section is defined by the overhanging section.

14. The lighting unit for a vehicle according to claim 10, wherein the second reflector is semitransparent, allowing the guided light to partially pass through.

15. The lighting unit for a vehicle according to claim 10, wherein the lighting unit is a front light provided in a vehicle body cover for covering the front of a motorcycle, and the light extension section is formed along a side surface of the vehicle cover.

16. The lighting unit for a vehicle according to claim 14, wherein the lighting unit is a front light provided in a vehicle body cover for covering the front of a motorcycle, and the light extension section is formed along a side surface of the vehicle cover.

17. The lighting unit for a vehicle according to claim 10, further comprising a light guiding body provided below the low beam lamps, said light guiding body being molded from a light guiding resin and guiding a portion of the light emitted from the low beam lamps to a location below the low beam lamps.

18. The lighting unit for a vehicle according to claim 10, wherein the second reflector is formed with a curved surface bending to the front in a convex shape so as to reflect light towards the first reflector, the first reflector has a curved uneven surface towards the rear, with a multi-cut front surface to carry out diffuse reflection.

* * * * *